May 27, 1930. B. STOCKFLETH ET AL 1,759,963
BRAKE MECHANISM FOR VEHICLES
Filed April 29, 1926 2 Sheets-Sheet 2
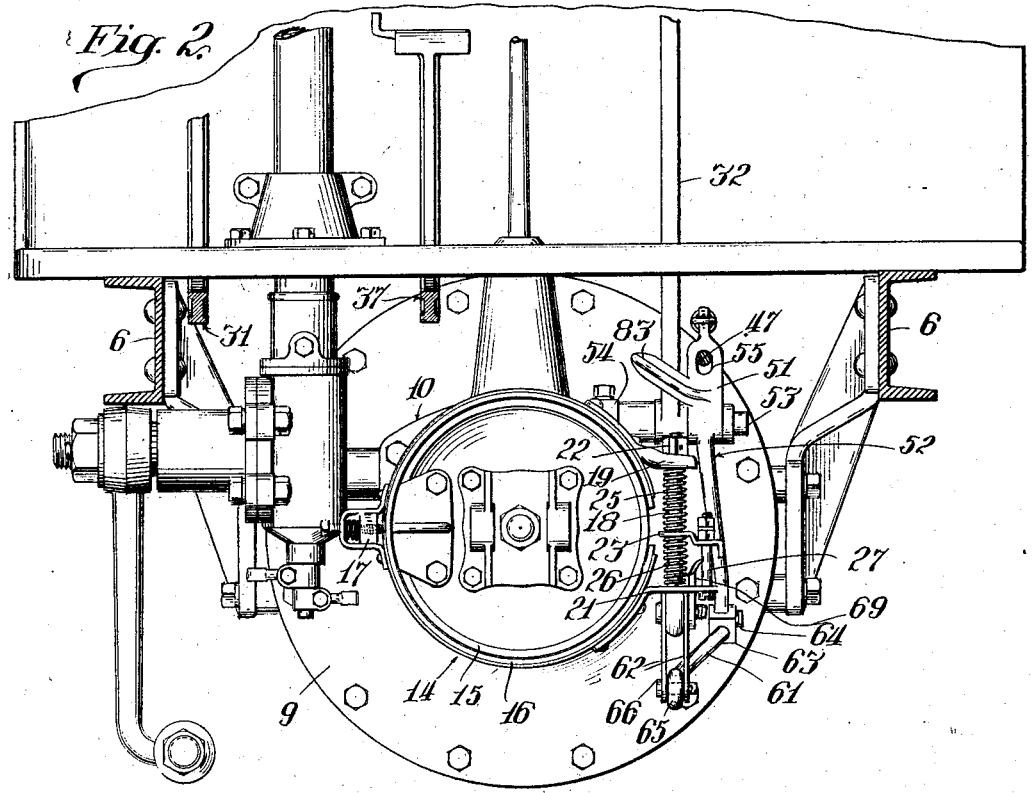
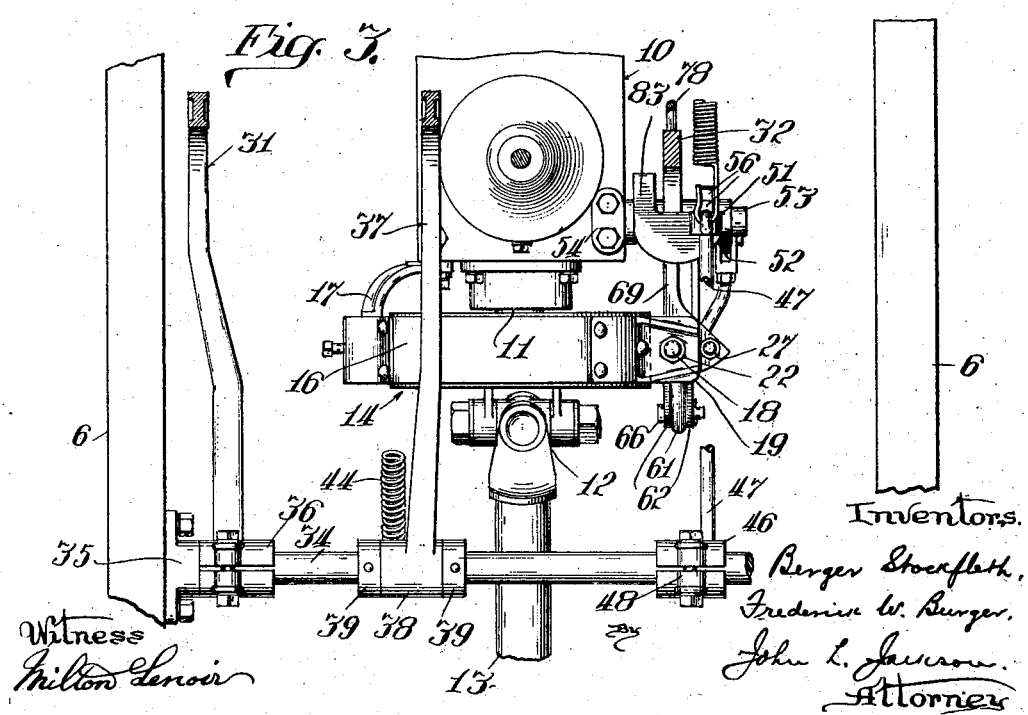

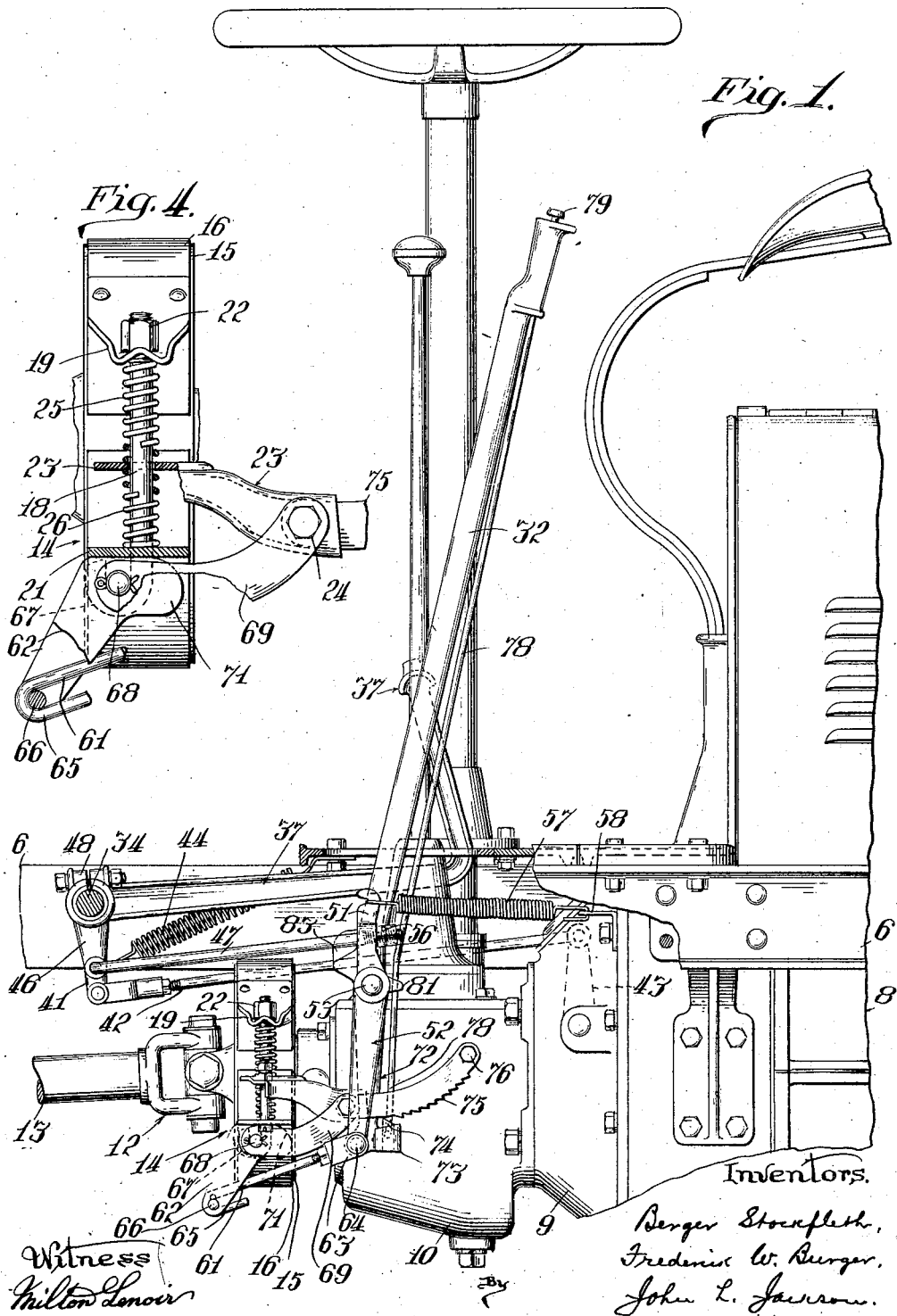

Patented May 27, 1930

1,759,963

UNITED STATES PATENT OFFICE

BERGER STOCKFLETH, OF BERRIEN SPRINGS, AND FREDERICK W. BURGER, OF NILES, MICHIGAN, ASSIGNORS TO CLARK TRUCTRACTOR COMPANY, OF BUCHANAN, MICHIGAN, A CORPORATION OF MICHIGAN

BRAKE MECHANISM FOR VEHICLES

Application filed April 29, 1926. Serial No. 105,450.

The present invention relates to brake mechanism for vehicles, and has as its primary object to provide an improved construction of brake actuating mechanism through which a single brake element can be operated, either from a foot control, such as a brake pedal, or from a hand control, such as the customary "emergency" brake lever.

The present construction of brake mechanism has been developed particularly for use in certain types of industrial trailers and tractors. In these types of vehicles, owing to cramped space, the smallness of the driving wheels and other factors, it is difficult and objectionable to perform the braking action on the drive wheels. Accordingly, the present brake mechanism has been developed so that all braking action can be performed on the propeller shaft. The present construction of brake actuating mechanism makes this practice feasible and advantageous by enabling both the foot and hand controls to operate independently on a single brake element mounted on the propeller shaft.

While the invention has been developed primarily for use on these small industrial trucks or tractors, nevertheless it would be understood that the essential characteristics of the invention have a wider field of application and can be embodied in vehicles generally.

In the accompanying drawings, illustrating a preferred embodiment of our invention:

Figure 1 is a fragmentary side view of a portion of one of these industrial trucks or tractors, a portion of the frame being broken away to more clearly show the invention;

Fig. 2 is a transverse sectional view through the vehicle taken on a plane directly in front of the propeller shaft brake and looking towards the power plant;

Fig. 3 is a horizontal sectional view of the brake operating parts; and

Fig. 4 is a fragmentary detail view illustrating the operative connection between the cam lever and brake band.

The frame of the vehicle is fragmentarily illustrated by the two side channels 6—6 extending longitudinally of the vehicle. Mounted on this frame is a power plant comprising an internal combustion engine 8, a clutch housing 9, and a transmission housing 10. In the particular construction shown, the engine 8, the clutch housing 9 and transmission housing 10 are all built in unit form. The stub shaft 11, which projects from the end of the transmission housing 10, is connected through a universal joint 12 to a propeller shaft 13 extending to the transverse driving shaft or axle of the driving wheels. The brake, designated 14 in its entirety, is mounted on this stub shaft 11, this type of brake being generally termed a "propeller shaft brake". It comprises the usual brake drum 15 mounted on the stub propeller shaft, and brake band 16 adapted to be contracted about the brake drum. The brake proper is constructed in accordance with the standard practice, the intermediate portion of the brake band 16 being secured to a bracket 17 bolted to the transmission housing, and the free ends of the brake band being adapted to be contracted through a rod 18 which passes freely through apertured lugs 19 and 21 projecting from the free ends of the brake band. A nut 22 screws over the upper threaded end of the rod 18 and bears against the top of the lug 19, affording an adjustment for the brake band. The intermediate portion of the rod 18 passes freely through a bracket 23, which is fixedly secured to the transmission housing 10 by the bolt 24. Compression springs 25 and 26 are confined on the rod 18 between the upper and lower sides of this bracket and the upper and lower lugs 19 and 21 for normally expanding the brake band out of frictional engagement with the brake drum. An adjusting bolt 27 passes through apertures in the lower brake band lug 21 and in the bracket 23, this bolt having adjusting nuts thereon by which the lower limit of movement of the bottom lug 21 can be adjusted. The lower end of the rod 18 has operative connection with the brake actuating parts in a manner which we shall hereinafter describe. The two brake controls consist of a foot operated pedal 31 and a hand operated or emergency lever 32. It is opportune to remark at this point that in some of these vehicles the driver's seat is so situated that the driver faces the driving end of the vehicle and in other vehicles of this type his seat is reversed so that the driver faces the steering end of the vehicle. In the type of the vehicle shown the driver's seat faces the driving end. It will be observed that in the former instance the driver would operate the emergency lever 32 by pushing on the same and in the latter instance by pulling on the same.

The foot pedal 31 passes up through the usual slot in the floor board and at its lower end is rigidly clamped to a transverse operating shaft 34. Opposite ends of this shaft are journalled in bearing brackets 35 secured to the side members 6 of the vehicle frame. The pedal is secured to the shaft by a split clamp 36, by which the angular position of the pedal, relative to the shaft, can be adjusted. This shaft also affords a pivot mounting for the usual clutch pedal 37. Suffice it to say that this clutch pedal has a hub 38 which is rotatably supported on the shaft 34 between two collars 39—39 pinned to the shaft. An arm 41 extends downwardly from this hub 38 and has pivotal connection through a connecting rod or link 42 with a clutch operating lever 43 disposed on one side of the clutch housing 9. A tension spring 44 connects to the depending arm 41 for assisting in holding the clutch in engaged position. These clutch operating parts have no particular cooperation with the present invention and need not be described in any further detail. Mounted on the transverse shaft 34 adjacent to its other end is an arm 46, to which one end of an operating rod or link 47 is pivotally connected. This arm has a split clamping hub 48 for mounting the arm on the transverse shaft, by the adjustment of which the angular position of the arm relative to the shaft can be adjusted. The other end of the link 47 has operative connection with the upper arm 51 of a brake actuating lever 52, journalled on a stationary pivot stud 53. This pivot stud constitutes part of a bracket 54 which is bolted to the top of the transmission housing 10. The lever 52 constitutes a brake actuating element common to both the brake pedal 31 and the hand lever 32. That is to say, the brake operating movement imparted to either one of these operating members 31 or 32 is transmitted to the brake through the instrumentality of the lever 52.

The link 47 passes through a hole 55 in the upper arm 51 of this brake actuating lever and has nuts 56 screwing over the threaded end thereof for engaging against the rear side of the lever arm 51. This affords a lost motion connection between the link and lever whereby depressing the brake pedal 31 is operative to swing the lever in a counterclockwise direction, but the lever is left free to swing in such direction independently of movement of the brake pedal, this independent movement occurring when the hand lever 32 is operated. By adjusting the nuts 56 along the threaded end of the link 47, the effective length of the link and setting of the brake system can be adjusted. A tension spring 57 is hooked over the upper end of the lever arm 51 and is extended to a bracket 58 secured to the power plant, this spring normally tending to swing the lever 52 in a clockwise direction corresponding to the released position of the brake. The lower arm of the brake actuating lever 52 has operating connection with the brake 14 through any desired system of linkage or operating parts. In the preferred construction shown, this operating connection is established through a link 61 and a cam lever 62. One end of the link 61 has adjustable threaded connection with a clevis 63 pivotally connected at 64 to the lower end of the actuating lever 52. The other end of this link is formed with a hook-like end 65, which hooks over a pin 66, carried at the lower end of the cam lever 62. This cam lever preferably consists of two duplicate side portions spaced apart, as best shown in Fig. 2, the pin 66 passing through the lower ends of these complementary side portions and the hook end 65 of the link 61 engaging over this pin between these two side portions.

As best shown in Fig. 4, the lower end of the rod 18 which passes up through the brake band lugs has a hook-like portion 67 which extends between the two side portions of the cam lever directly below the lower brake band lug 21. A pivot pin 68 passes through the two side portions of the lever and hangs in this hooked end 67 of the rod 18. This pivot pin also passes through the outer end of a link 69 which is supported at its other end on the attaching bolt 24. The link 69 affords a floating support for guiding the swinging movement of the cam lever 62 and the contracting movement of the lower part of the brake band. The two lever portions 62—62 have cam ends 71 which are adapted to bear against the bottom of the brake band lug 21 in contracting the band in the braking operation. The hand operated "emergency" lever 32 is pivoted on the same stud 53 with the actuating lever 52 so that the movements of these two levers will be concentric. The lower end 72 of this hand lever carries a guide boss 73, in which is guided a latching dog 74. This latching dog is adapted to engage in the teeth of a notched sector 74, which is secured to the side of the transmission housing, at one end by the bolt or cap screw 24, and at the lower end by a second bolt or cap screw 76. As best shown in Fig. 4, the lower end of this sector is preferably extended into a socket-like portion formed in the end of the bracket 23. This bracket 23 is preferably a sheet metal stamping and has two marginal flanges turned over along its upper and lower edges, forming a socket therebetween into which the end of the sector 75 is extended. The latching dog 74 is released through a latch releasing rod 78, which extends up alongside of the hand lever 32 and carries a latch releasing button 79 at its upper end. The lower portion of this latch releasing rod is guided in a boss or apertured lug 81 extending from the lever 32, adjacent its point of pivotal support. Any suitable spring may be embodied in the boss 73 or may have other suitable connection with this latch releasing rod 78 for normally moving the latching dog 74 into the teeth of the sector 75.

A fixed shoulder on lug 83 is extended laterally and upwardly from the front side of the lever arm 51 to extend across the front side of the manually operated, or "emergency" lever 32 at a point above the common pivot 53. This lug affords a lost motion connection between the emergency lever 32 and the brake actuating lever 52, being engaged by the emergency lever when the latter is thrust forwardly so as to cause both levers to move as one, but permitting independent motion of the actuating lever 52 under pedal operation. Considered in another way, the upper arm of the emergency lever 32 and the actuating lever 52 constitute two parts of a broken lever through which brake actuating motion can be transmitted from the emergency lever, and through the lower part of which brake actuating motion can be transmitted from the brake pedal. Obviously, in the operation of the emergency lever 32 any setting given this lever will be retained by the dog 74 and sector 75. If this setting of the emergency lever is incapable of applying sufficient braking retardation to the vehicle, additional braking effort can be applied through the foot pedal, and when such effort is released the setting given the brake by the emergency lever will be restored. By this construction, therefore, the operator may partially set the brake by means of the emergency lever and latch it in such position, and then obtain such additional braking effect as may be required by means of the pedal.

While the foregoing description and drawings disclose an embodiment of our invention which we deem preferable, it will of course be understood that the invention is not limited to the specific arrangement therein described and shown, except in so far as claims may be drawn to specific features of arrangement, but includes generically the subject matter of the broader claims.

What we claim as new and desire to secure by Letters Patent of the United States, is:

1. In brake mechanism for vehicles, the combination of a propeller shaft brake drum, a contracting brake band cooperating therewith, a brake actuating lever, means transmitting motion from said brake actuating lever to said brake band for contracting the same, a pedal, connecting means operatively connecting the pedal with said brake actuating lever and comprising a lost motion connection, a notched sector, an emergency lever pivoted concentrically with said brake actuating lever, a latching dog carried by said emergency lever adapted to engage said sector for latching said lever, and a fixed shoulder projecting from said brake actuating lever into the path of movement of said emergency lever for causing both of said levers to move simultaneously when said emergency lever is moved toward brake engaging position.

2. In brake mechanism for vehicles, the combination of a propeller shaft brake, a brake actuating lever, means operatively connecting said lever with said brake, a brake pedal having a lost motion connection with said lever, a manually operable lever mounted concentrically with said brake actuating lever, a fixed shoulder carried by said brake actuating lever and extending across the path of and adapted to be engaged by said manually operable lever only when the same is moved toward brake setting position, and latching means associated with said manually operable lever for latching the same in brake setting position.

3. In a brake mechanism for vehicles, the combination of a propeller shaft brake, a brake actuating lever, means operatively connecting said brake actuating lever with said propeller shaft brake, a brake pedal, a pivotal support for said pedal, said support being offset a relatively great distance forwardly of the tread portion of the pedal, a linkage connecting said pedal with said brake actuating lever, an emergency lever pivoted concentrically with said brake actuating lever, and a fixed shoulder on said brake actuating lever extending across the path of and adapted to be engaged by said emergency lever when said lever is moved toward brake setting position.

BERGER STOCKFLETH.
FREDERICK W. BURGER.